US012636727B1

(12) United States Patent
Long et al.

(10) Patent No.: US 12,636,727 B1
(45) Date of Patent: May 26, 2026

(54) INTERMEDIATE ALLOY, PREPARATION METHOD THEREFOR, AND USE THEREOF

(71) Applicants: CHINA ACADEMY OF MACHINERY ZHENGZHOU RESEARCH INSTITUTE OF MECHANICAL ENGINEERING CO., LTD., Zhengzhou (CN); Material Research Institute of Henan Academy of Sciences, Zhengzhou (CN)

(72) Inventors: Weimin Long, Zhengzhou (CN); Aiguo Li, Zhengzhou (CN); Yuan Li, Zhengzhou (CN); Sujuan Zhong, Zhengzhou (CN); Quanbin Lu, Zhengzhou (CN); Jian Qin, Zhengzhou (CN)

(73) Assignees: CHINA ACADEMY OF MACHINERY ZHENGZHOU RESEARCH INSTITUTE OF MECHANICAL ENGINEERING CO., LTD., Zhengzhou (CN); Material Research Institute of Henan Academy of Sciences, Zhengzhou (CN)

( * ) Notice: Subject to any disclaimer, the term of this patent is extended or adjusted under 35 U.S.C. 154(b) by 0 days.

(21) Appl. No.: 19/002,803

(22) Filed: Dec. 27, 2024

(30) Foreign Application Priority Data

Nov. 22, 2024 (CN) .......................... 202411691781.3

(51) Int. Cl.
| | |
|---|---|
| *B23K 20/00* | (2006.01) |
| *B23K 20/02* | (2006.01) |
| *B23K 35/40* | (2006.01) |
| *C22C 5/06* | (2006.01) |
| *B23K 101/32* | (2006.01) |
| *B23K 103/08* | (2006.01) |

(52) U.S. Cl.
CPC ............ *B23K 20/001* (2013.01); *B23K 20/02* (2013.01); *B23K 35/40* (2013.01); *C22C 5/06* (2013.01);
(Continued)

(58) Field of Classification Search
CPC .......... B23K 20/001; B23K 35/40–406; B23K 2101/32; B23K 2103/08;
(Continued)

(56) References Cited

U.S. PATENT DOCUMENTS

| | | | | |
|---|---|---|---|---|
| 2,842,440 A | * | 7/1958 | Nachtman ............ | B23K 20/001 |
| | | | | 428/592 |
| 3,800,405 A | * | 4/1974 | Ziemek ................ | B23K 20/001 |
| | | | | 228/262.5 |

(Continued)

FOREIGN PATENT DOCUMENTS

| | | | | | |
|---|---|---|---|---|---|
| CA | 2939189 C | * | 10/2023 | ......... | B23K 35/0227 |
| CN | 104741817 A | * | 7/2015 | ......... | B23K 35/3006 |

(Continued)

*Primary Examiner* — Kiley S Stoner
(74) *Attorney, Agent, or Firm* — Bayramoglu Law Offices LLC

(57) ABSTRACT

The present disclosure provides an intermediate alloy and a preparation method therefor, and use thereof. The preparation method of the intermediate alloy includes the following steps: S1, performing stranding by taking a wire material of a doping element as a core material and taking a base material wire as a peripheral stranding wire to obtain a first stranding wire; S2, performing diffusion welding on the first stranding wire in a vacuum environment or under a protection of an inert atmosphere, so that a metallurgical bonding is formed between the wire material of the doping element and the base material wire, so as to obtain a second stranding wire; and S3, drawing the second stranding wire to obtain an intermediate alloy wire.

8 Claims, 1 Drawing Sheet

(52) U.S. Cl.
CPC ...... *B23K 2101/32* (2018.08); *B23K 2103/08* (2018.08)

(58) Field of Classification Search
CPC ........... B23K 20/02–04; B23K 35/0216–0227; B23K 35/0261; C22C 5/06
USPC .................................. 228/155–156, 193–195
See application file for complete search history.

(56) References Cited

U.S. PATENT DOCUMENTS

| | | | | |
|---|---|---|---|---|
| 2004/0014266 A1* | 1/2004 | Uno | .......................... | C22C 5/02 |
| | | | | 257/E23.025 |
| 2017/0008130 A1* | 1/2017 | Miklos | .............. | B23K 35/3033 |

FOREIGN PATENT DOCUMENTS

| | | | | | | |
|---|---|---|---|---|---|---|
| CN | 109411437 A | * | 3/2019 | ......... | H01L 21/4896 |
| CN | 109411591 A | * | 3/2019 | ............... | C22F 1/14 |
| CN | 108326475 B | * | 2/2020 | ............ | B23K 35/40 |
| CN | 113245743 A | * | 8/2021 | ......... | B23K 35/0266 |
| CN | 114502754 A | * | 5/2022 | ............ | H01L 24/07 |
| CN | 114985507 A | * | 9/2022 | ............ | B22D 11/18 |
| CN | 115383343 A | * | 11/2022 | ......... | B23K 35/0222 |
| CN | 116511758 A | * | 8/2023 | ............ | B23K 35/24 |
| DE | 2153317 A | * | 5/1975 | | |
| DE | 2153317 A1 | * | 5/1975 | | |
| EP | 204203 A2 | * | 12/1986 | | |
| WO | WO-2017094713 A1 | * | 6/2017 | ............... | B22F 1/00 |

* cited by examiner

1

INTERMEDIATE ALLOY, PREPARATION METHOD THEREFOR, AND USE THEREOF

CROSS-REFERENCE TO RELATED APPLICATION

The present disclosure claims the priority to the Chinese patent application with the filling No. 2024116917813 filed with the Chinese Patent Office on Nov. 22, 2024, and entitled "INTERMEDIATE ALLOY, PREPARATION METHOD THEREFOR, AND USE THEREOF", the contents of which are incorporated herein by reference in entirety.

TECHNICAL FIELD

The present disclosure relates to the technical field of bonding wires, and specifically to an intermediate alloy and a preparation method therefor, and use thereof.

BACKGROUND ART

The intermediate alloys can be used to prepare bonding wires, and can be taken as contact materials for various types of switches, controllers, and circuit breakers, etc. The performance of intermediate alloy has an important influence on the product. The traditional preparation method of the intermediate alloy is to directly add the alloying elements into the base material by smelting, in which the components are compulsively mixed evenly by a mechanical or electromagnetic stirring method; and then the intermediate alloy billet with a certain shape is obtained by casting, or continuous casting, etc. When preparing intermediate alloys containing insoluble elements (wherein the insoluble elements refer to the elements that are difficult to dissolve in the base material), such as Ag—Ni intermediate alloy, Ag—Co intermediate alloy, and Ag—Cr intermediate alloy, in order to dissolve more insoluble elements, a third alloying element can also be introduced during the smelting process, which can react with the insoluble elements. The reaction product can be more dissolved in the base material to play the role of alloy strengthening, such as silver-copper-nickel alloy.

However, the traditional smelting method still has the problem that the adding content of the insoluble element is limited, which will affect the alloy performance. Moreover, since the density difference exists between the elements, the macrosegregation and the microsegregation of the insoluble element are very easy to occur during the smelting process. Even if the alloying elements are forced to evenly distribute during the smelting process by stirring, the elements will segregate again during the long-term solidification process, which weakens the strengthening effect of the alloying elements, and affects the uniformity of the microstructure. The serious element segregation will deteriorate the performance of the alloy, and is not beneficial to the precise control of the components in the subsequent use. Therefore, it is of great significance to provide an intermediate alloy with a high content of insoluble elements and the insoluble elements distributed uniformly and its preparation method.

In view of this, the present disclosure is proposed.

SUMMARY

A first object of the present disclosure is to provide a preparation method of an intermediate alloy to solve the technical problems in the prior smelting method that the adding content of the insoluble element is limited and it is easy to occur segregation when preparing the intermediate alloy. The intermediate alloy of the present disclosure is prepared by mechanical stranding, metallurgical bonding, and drawing, which breaks through the solubility limitation of the insoluble element in the base material, and can significantly improve the content and uniformity of the insoluble element in the intermediate alloy.

A second object of the present disclosure is to provide an intermediate alloy, which is prepared by using the preparation method of the intermediate alloy above.

A third object of the present disclosure is to provide the use of the above intermediate alloy in the preparation of bonding wires.

In order to realize the above objects, the present disclosure adopts the following technical solutions.

A preparation method of an intermediate alloy includes the following steps:

S1, performing stranding by taking a wire material of a doping element as a core material and taking a base material wire as a peripheral stranding wire to obtain a first stranding wire;

S2, performing diffusion welding on the first stranding wire in a vacuum environment or under a protection of an inert atmosphere, so that a metallurgical bonding is formed between the wire material of the doping element and the base material wire, so as to obtain a second stranding wire;

S3, drawing the second stranding wire to obtain an intermediate alloy wire.

Preferably, the following steps are included after step S3:

S4, performing at least one iterative operation according to steps S1, S2, and S3 by taking the intermediate alloy wire as a new core material and peripheral stranding wire, wherein the intermediate alloy wire obtained in the previous step needs to be annealed before each iterative operation.

Preferably, the wire material of the doping element includes any one of Ni wire, Co wire, or Cr wire; and the base material wire is a silver wire.

Preferably, in step S1, a wire material purity of the doping element is $\geq 99\%$.

Preferably, in step S1, a purity of the base material wire is $\geq 99.9\%$.

Preferably, in step S1, a stranding method is regular stranding in the same direction.

Preferably, in step S1, the core material and the peripheral stranding wire have the same wire diameter; and in the first stranding wire, one core material is provided, and a total amount of the wire materials of the core material and the peripheral stranding wire is $N=1+3k(k-1)$, where k is the amount of layers of the stranding wires.

Preferably, in the first stranding wire, the amount k of layers of the stranding wires satisfies: $2 \leq k \leq 6$.

Preferably, a mass percentage of the doping element in the intermediate alloy is calculated according to the following formula: $C_x = m_x/(m_x + m_a) = A_x L_x \rho_x / [A_x L_x \rho_x + \Sigma(n_{ia} A_a \rho_a L_x \theta_i)]$, where the summation operation in the formula is to add from i=2 to k, where $m_x$ is a mass of the wire material of the doping element; $m_a$ is a mass of the base material wire; $A_x$ is a sectional area of the wire material of the doping element; $L_x$ is a length of the wire material of the doping element; $\rho_x$ is a density of the wire material of the doping element; $n_i$ is the amount of base material wires of layer i; $A_a$ is a sectional area of the base material wire; $\rho_a$ is a density of the base material wire; $\theta_i$ is a stranding coefficient of layer i; and $L_x \theta_i$ is a length of a single base material wire of layer i.

Preferably, the mass percentage of the doping element in the intermediate alloy is 0.5%-10%.

Preferably, in step S1, the stranding coefficient θ of any layer during the stranding is between 1 and 1.447.

Preferably, in step S2, the vacuum environment has an absolute pressure of $\leq 5 \times 10^{-3}$ Pa.

Preferably, in step S2, the diffusion welding is performed at a temperature of 800-900° C. for 1-2 h.

Preferably, in step S3, a single-pass area reduction rate of the drawing is 7%-15%, and a rate of the drawing is 10-300 m/min; and/or, a wire diameter of the intermediate alloy wire obtained after the drawing is 0.5-1 mm.

Preferably, in step S4, the iterative operations are performed 2-4 times.

Preferably, in step S4, the amount of layers of stranding of the intermediate alloy wire during the iterative operation is 2-6 layers.

Preferably, a wire diameter of a final intermediate alloy wire obtained after the iterative operation is 0.5-1 mm.

Preferably, in step S4, an annealing temperature is 300-750° C., and an annealing duration is 1-10 min.

An intermediate alloy is provided, and it is prepared by using the preparation method of the intermediate alloy according to any one of the foregoing embodiments.

Use of the above intermediate alloy in the preparation of bonding wires is provided.

Compared with the prior art, the method of the present disclosure includes the following beneficial effects.

The present disclosure adopts a method of stranding-diffusion welding-drawing to prepare the intermediate alloy, which breaks through the solubility limitation of the insoluble element, and can prepare the intermediate alloy with a high content of the insoluble element. Compared with the traditional smelting method, the distribution of the elements in the intermediate alloy prepared by the method of the present disclosure is more uniform; the precise of the content of the element in the obtained intermediate alloy is higher; and it is convenient for the subsequent regulation for the bonding wire components when preparing the bonding wire.

BRIEF DESCRIPTION OF DRAWINGS

In order to more clearly illustrate the technical solutions in the specific embodiments of the present disclosure or in the prior art, the drawings to be used in the description of the specific embodiments or the prior art will be briefly introduced below. It is obvious that the drawings described below are some embodiments of the present disclosure. For those ordinarily skilled in the art, other drawings can be obtained from these drawings without inventive efforts.

DETAILED DESCRIPTION OF EMBODIMENTS

Figure 1:
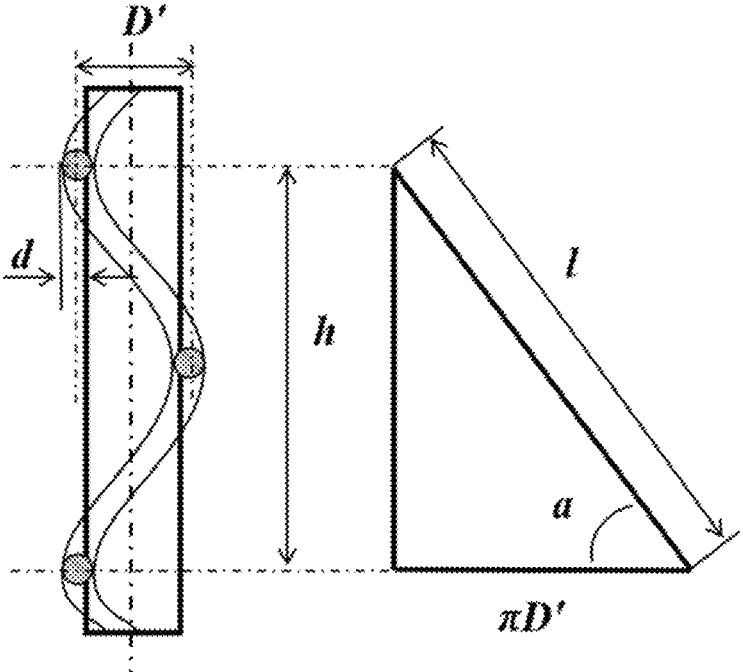
FIG. 1 shows a relationship diagram of relevant parameters of a calculation process of a stranding-wire stranding coefficient in the embodiments of the present disclosure.

The technical solutions of the present disclosure will be clearly and completely described below in conjunction with the drawings and the specific embodiments. It will be understood by those skilled in the art that the embodiments described below are partial embodiments of the present disclosure and not all of them, and are used only to illustrate the present disclosure, and should not be regarded as a limitation of the scope of the present disclosure. Based on the embodiments in present disclosure, all other embodiments obtained by a person of ordinary skill in the art without inventive efforts all fall within the scope of protection of the present disclosure. Where specific conditions are not indicated in the examples, they shall be performed based on the usual conditions or those recommended by manufacturers. The reagents or instruments used without indication of the manufacturers are conventional products that can be purchased commercially.

A first aspect of the present disclosure provides a preparation method of an intermediate alloy, including the following steps.

S1, performing stranding by taking a wire material of a doping element as a core material and taking a base material wire as a peripheral stranding wire to obtain a first stranding wire;

S2, performing diffusion welding on the first stranding wire in a vacuum environment or under a protection of an inert atmosphere, so that a metallurgical bonding is formed between the wire material of the doping element and the base material wire, so as to obtain a second stranding wire; and S3, drawing the second stranding wire to obtain an intermediate alloy wire.

The method of the present disclosure performs stranding by taking the wire material of the doping element as the core material and taking the base material wire as the peripheral stranding wire, so as to obtain the first stranding wire. The diffusion welding is performed on the first stranding wire, so that the metallurgical bonding is formed between the wire material of the doping element and the base material wire. It is to ensure that the stranding wire can be deformed uniformly and continuously in the subsequent drawing and deformation process, so that the doping element is uniformly distributed in the length direction. The diffusion welding is carried out in a vacuum or in an inert atmosphere, which is to avoid the oxidation or vulcanization of the base material.

Compared with the traditional smelting method, the present disclosure adopts a method of stranding-diffusion welding-drawing to prepare the intermediate alloy. Since it does not need to perform the smelting and mixing, it can break through the solubility limitation of the insoluble element during the smelting, and can prepare the intermediate alloy with a high content of the insoluble element; and the doping element in the intermediate alloy wire prepared by using the method of the present disclosure is distributed more uniformly in the length direction. The alloy wires prepared by the present disclosure are usually used by taking segments in the length direction. Therefore, for thin wires, the uniformity of the overall distribution of the element can be reflected by the uniformity of the distribution of the element in the length direction, and the precise control of the content of the intermediate alloy element can be realized in use.

In some specific embodiments of the present disclosure, the following steps are further included after step S3.

S4, performing at least one iterative operation according to steps S1, S2, and S3 by taking the intermediate alloy wire obtained in step S3 as a new core material and peripheral stranding wire, wherein the intermediate alloy wire obtained in the previous step needs to be annealed before each iterative operation.

In step S4, the iterative operation means performing the stranding, diffusion welding, and drawing again according to the method in steps S1, S2, and S3 by taking the intermediate alloy wire obtained in the previous step as a new core material and peripheral stranding wire, so as to obtain the intermediate alloy wire, i.e., this is an iterative process. The above iterative process in the present disclosure is performed at least once. If the interaction needs to be performed multiple times, the intermediate alloy wire obtained in the previous iteration is taken as the core material and peripheral stranding wire of the next iteration for the preparation. In the present disclosure, the stranding, diffusion welding, and drawing are repeatedly performed on the obtained intermediate alloy wire, which can improve the distribution uniformity of the element in the radial direction of the alloy wire, and further improve the uniformity of the element distribution in the entire intermediate alloy wire, so as to realize the precise control on element content of the intermediate alloy.

In the present disclosure, the intermediate alloy wire obtained in the previous step needs to be annealed before each iterative operation, wherein the reason is the stranding wire is hardened after multiple times of drawing, so that the plasticity is significantly reduced. In order to continue the iterative process, the intermediate alloy wire obtained after drawing needs to be annealed, so that the wire recovers its strong plasticity.

In some specific embodiments of the present disclosure, it further includes a step of cutting the intermediate alloy wire obtained in step S3 or S4 in segments, and the length after cutting is 3-10 mm.

In some specific embodiments of the present disclosure, the wire material of the doping element includes any one of Ni wire, Co wire, or Cr wire; and the base material wire is a silver wire.

In some specific embodiments of the present disclosure, in step S1, a wire material purity of the doping element is ≥99%. The higher the wire material purity is, the higher the precision of the content of the corresponding element in the prepared intermediate alloy is. Since the content of the doping element in the intermediate alloy is smaller, and it is usually smaller than 10%, the wire material purity of the doping element can meet the requirements of the preparation when reaching 99%. For example, taking 1% AgNi intermediate alloy as an example, the Ni wire with a purity of 99% is added. The intermediate alloy finally prepared has an error of only $\frac{1}{10,000}$, which can satisfy the requirements of subsequent material preparation; and the 99% wire is easy to make, purchase, and process.

In some specific embodiments of the present disclosure, in step S1, a purity of the base material wire is ≥99.9%. Since the base material elements account for a large proportion of the intermediate alloy, and its purity has a large impact on the final composition error of the intermediate alloy, it is recommended that the purity is not smaller than 99.9%; and at the same time, 99.9% of the base material is also easy to purchase and process.

In some specific embodiments of the present disclosure, in step S1, the stranding method is regular stranding in the same direction. The wire stranded by the regular stranding is more rounding compared to bunched stranding, compound stranding, and other method; and compared to forward and reverse stranding, the wire material of each layer of the same-direction stranding is arranged tightly, and the production efficiency is higher.

In some specific embodiments of the present disclosure, in step S1, the core material and the peripheral stranding wire have the same wire diameter. The initial wire diameter is controlled to be 0.5-1 mm, for example, it can be any one or a range consisted of any two values of 0.5 mm, 0.6 mm, 0.8 mm, and 1.0 mm. In the first stranding wire, one core material is provided, and a total amount of the wire materials of the core material and the peripheral stranding wire is N=1+3k(k−1), where k is the amount of layers of the stranding wires.

It is relatively simple to weave by using the wire material with the same diameter, and is also easy to calculate the composition. The wire diameter is controlled to be 0.5-1 mm, which is to facilitate the purchase, processing, and weaving. The weaved structure formed with one wire material of the doping element as the core and the base material wires as the peripheral stranding wire has smaller pores, and the wire material is tightly arrayed; and at the same time, this structure is convenient to meet the composition requirement of the intermediate alloy element. The total amount of the wire materials of the core material and the peripheral stranding wire is controlled to be N=1+3k(k−1), which is for the smoothness of the stranding wire as much as possible.

In some specific embodiments of the present disclosure, in the first stranding wire, the amount k of layers of the stranding wires satisfies: 2≤k≤6, for example, the amount of layers of the stranding wires can be 2, 3, 4, 5, or 6. The amount of layers of the stranding wires is controlled within the range, which meets the requirement of the content proportion of the doping element in the intermediate alloy.

In some specific embodiments of the present disclosure, a mass percentage of the doping element in the intermediate alloy is calculated according to the following formula: $C_x=m_x/(m_x+m_a)=A_xL_x\rho_x/[A_xL_x\rho_x+\Sigma(n_{ia}A_a\rho_aL_x\theta_i)]$, where the summation operation in the formula is to add from i=2 to k, where $m_x$ is a mass of the wire material of the doping element; $m_a$ is a mass of the base material wire; and $A_x$ is a sectional area of the wire material of the doping element, where $A_x=\pi d_x^2/4$, $d_x$ is a wire material diameter of the doping element; $L_x$ is a length of the wire material of the doping element; $\rho_x$ is a density of the wire material of the doping element; $n_i$ is the amount of base material wires of layer I, where $n_i=N_i-N_{i-1}$; $N_i$ represents the total amount of the wire materials when the amount of the stranding layer is i; $N_{i-1}$ represents the total amount of the wire materials when the amount of the stranding layer is i−1, where i is 2-6; $A_a$ is a sectional area of the base material wire, where $A_a=\pi d_a^2/4$, $d_a$ is a diameter of the silver wire; pa is a density of the parent wire; $\theta_i$ is a stranding coefficient of layer i; and $L_x\theta_i$ is a length of a single base material wire of layer i.

In some specific embodiments of the present disclosure, the mass percentage of the doping element in the intermediate alloy is 0.5%-10%, for example, it can be any one or a range consisted of any two values of 0.5%, 1%, 3%, 5%, 7%, 9%, and 10%.

Figure 2:
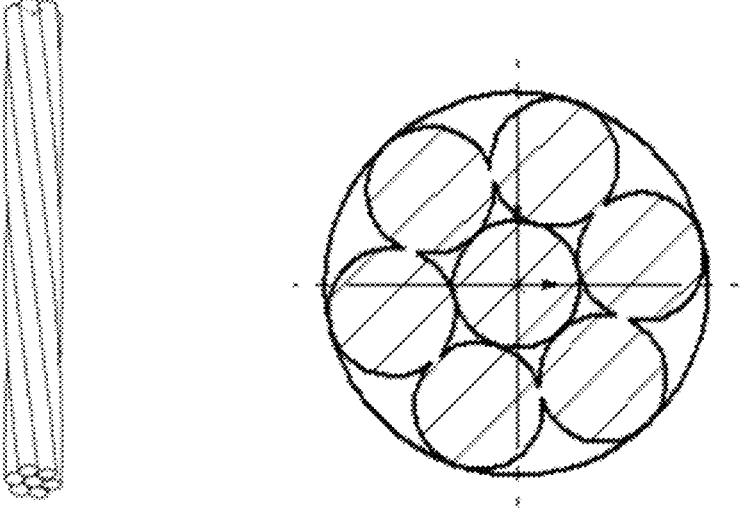
FIG. 2 shows a structure schematic diagram of a double-layer stranding wire provided by the embodiments of the present disclosure.

In some specific embodiments of the present disclosure, in step S1, the stranding coefficient θ of any layer during the stranding is between 1 and 1.447. The stranding coefficient θ is determined by the definition of the stranding coefficient and the stranding structure. As shown in FIG. 1, θ=l/h, l and h are beveled edge and right angles of a right triangle respectively, where θ>1, and the maximum value of θ is related to the stranding structure. The maximum stranding coefficient of the layer i is $\theta_{imax}=l_i/h_{imin}$, where $h_{imin}=n_id_a$, $l_i^2=(\pi D')^2+(h_{imin})^2$, and $D'=2(i-1)d_a$, so that $1<\theta_i<\theta_{imax}$. When the stranding wire is a two-layer structure, as shown in FIG. 2, the amount of base material wires of the second layer is 6, and the diameter is $d_a$; and the amount of alloy wire of the first layer is 1, and the diameter is $d_x$, where $h_{2min}=6d_a$, $\pi D'=2\pi d_a$, $\theta_{2max}=l_2/h_{2min}=(4\pi^2d_a^2+36d_a^2)^{0.5}/6d_a=1.447$. By analogy, it can obtain $\theta_{3max}=1.447$, $\theta_{4max}=1.447$, $\theta_{5max}=1.447$, and $\theta_{6max}=1.447$.

In some specific embodiments of the present disclosure, a diameter of the outer circle of the first stranding wire is 1.5-5.5 mm, and this specification facilitates subsequent processing.

In some specific embodiments of the present disclosure, in step S2, the vacuum environment has an absolute pressure of $\leq 5 \times 10^{-3}$ Pa, which exhausts the air as much air as possible to avoid oxidization of the base material wires at high temperatures.

In some specific embodiments of the present disclosure, in step S2, when the base material is silver, the temperature of the diffusion welding is 800-900° C., for example, it can be any one or a range consisted of any two values of 800° C., 820° C., 850° C., 880° C., and 900° C.; and the duration of the diffusion welding is 1-2h, for example, it can be any one or a range consisted of any two values of 1 h, 1.2h, 1.5h, 1.8h, and 2h. By controlling the diffusion welding temperature to be close to the melting point of silver in the above range, the diffusion speed of atoms is faster.

In some specific embodiments of the present disclosure, in step S3, a single-pass area reduction rate of the drawing is 7%-15%, and a rate of the drawing is 10-300 m/min. During the drawing process, the diameter of the stranding wire is gradually reduced to 1 mm by using a large drawing machine first, wherein the area reduction rate is 10%-15%, and the rate of drawing is 10 m/min-50 m/min; and then the stranding wire is continuously drawn by multiple passes by using a tower-wheeled medium-drawing machine, so that the diameter of the stranding wire is uniformly reduced to the target diameter, wherein the single-pass area reduction rate is 7%-10%, and the drawing rate is 150 m/min-300 m/min.

The large drawing machine usually draws the wire with a diameter of 1-8 mm, and the drawing rate is slower. The thicker the wire is, the slower the drawing is, and the area reduction rate is larger. Since the wire elongation is usually about 10%, it is recommended to draw the stranding wire more than 1 mm by using the large drawing machine, and to draw the stranding wire smaller than 1 mm by using the tower-wheeled continuous drawing machine, which has a faster rate, and higher efficiency, and the area reduction rate is usually about 8%.

In some specific embodiments of the present disclosure, in step S3, the drawing wire diameter of a final intermediate alloy wire obtained after the iterative operation is 0.5-1 mm, for example, it can be any one or a range consisted of any two values of 0.5 mm, 0.6 mm, 0.7 mm, 0.8 mm, 0.9 mm, and 1 mm.

In some specific embodiments of the present disclosure, in step S4, the iterative operations are performed 2-4 times, for example, it can be 2, 3, or 4 times. The increase of the number of iterations improves the uniformity of the distribution of compositions in the radial direction, but too many iterations will lead to the increase of costs.

In some specific embodiments of the present disclosure, in step S4, the amount of layers of stranding when stranding the intermediate alloy wire during the iterative operation is 2-6 layers, for example, it can be 2, 3, 4, 5, or 6 layers. During the iterative process, the increase of the number of the stranding layers of the intermediate alloy wire can improve the uniformity of distribution of compositions in the radial direction, but too many layers will lead to a complicated process and increase of costs.

In some specific embodiments of the present disclosure, a wire diameter of the final intermediate alloy wire obtained after the iterative operation is 0.5-1 mm, for example, it can be any one or a range consisted of any two values of 0.5 mm, 0.6 mm, 0.7 mm, 0.8 mm, 0.9 mm, and 1 mm.

In some specific embodiments of the present disclosure, in step S4, the annealing is on-line annealing, and the annealing temperature is 300-750° C., for example, it can be any one or a range consisted of any two values of 300° C., 350° C., 400° C., 450° C., 500° C., 600° C., 700° C., and 750° C.; and the annealing duration is 1-10 min, for example, it can be any one or a range consisted of any two values of 1 min, 3 min, 5 min, 7 min, and 10 min.

A second aspect of the present disclosure provides an intermediate alloy, which is prepared by using the preparation method of the intermediate alloy according to any one of the foregoing embodiments. Compared to the intermediate alloy prepared by the traditional smelting method, the intermediate alloy provided by the present disclosure has a higher component precision, and the distribution uniformity of elements is better.

A third aspect of the present disclosure provides the use of the above intermediate alloy in the preparation of bonding wires.

Some embodiments of the present disclosure are described in detail below in connection with specific application embodiments. The raw material substances used in the embodiments are available through commercially available purchases if not otherwise specified.

Example 1

As an example, a silver-based intermediate alloy with a Ni content of 1.184% was prepared. It included the following steps.

S1. Blank preparation. One Ni wire with 99% purity was cut off as a core layer (the first layer), wherein the diameter $d_{Ni}$ was 0.5 mm, and the length $L_{Ni}$ was 5 m; and an Ag wire with the same diameter was taken and tightly arrayed by 5 layers in total on the periphery of the Ni wire. The amount and the length of silver wires in each layer were obtained according to the amount formula and the stranding coefficient formula of the wire material, wherein the amount in the second layer was 6, the length was 7 m, and the stranding coefficient was taken as 1.4; the amount in the third layer was 12, the length was 6 m, and the stranding coefficient was taken as 1.2; the amount in the fourth layer was 18, the length was 6m, and the stranding coefficient was taken as 1.2; and the amount in the fifth layer was 24, the length was 5.5 m, and the stranding coefficient was taken as 1.1. According to the formula of $C_{Ni}=m_{Ni}/(m_{Ni}+m_{Ag})$, the theoretical content of Ni in the blank was calculated as 1.184%.

The foregoing intermediate alloy blank was stranded, weaved and rounded by using the regular stranding method in the same direction, so that each wire material was arrayed densely, and first silver stranding wire was prepared.

S2. The first silver stranding wire was connected in a vacuum diffusion method by using diffusion welding, wherein an absolute pressure of the diffusion welding was $5 \times 10^{-3}$ Pa, a temperature was 750° C., and a duration was 2h; and the Ag—Ni and Ag—Ag interfaces had diffusion to form a metallurgical connection, so that the second silver stranding wire was obtained.

S3. The diameter of the second silver stranding wire was gradually reduced to 1 mm by using a large drawing machine, wherein an area reduction rate was 10%-15%, and a rate of drawing was 10 m/min-50 m/min; and then the silver stranding wire was continuously drawn by multiple passes by using a tower-wheeled medium-drawing machine, wherein the diameter of the silver stranding wire was uniformly reduced to 0.5 mm; the single-pass area reduction rate was 7%-10%; and the drawing rate was 150 m/min~300 m/min, so that the silver stranding wire (the silver-based intermediate alloy wire) after drawing was obtained.

S4. The middle annealing was performed on the silver stranding wire after drawing by using an on-line annealing machine at a temperature of 500° C. for 5 min, and it was protected by using an inert gas during the annealing process, wherein a flow rate was 3 L/min. A plurality of annealed silver stranding wires were prepared according to the above steps. It was taken 19 annealed silver stranding wires as a new core material and peripheral stranding wires, which were re-woven and stranded into a three-layer silver stranding wire according to the method in step S1, and the diffusion connection-drawing was performed again according to the methods in steps S2-S3. It was iterated three times according to the above steps, and no further annealing was carried out after the last iteration, so as to obtain the final silver-based intermediate alloy wire.

The final obtained silver-based intermediate alloy wire was cut into 3-10 mm segments for use as an intermediate alloy.

Example 2

As an example, a silver-based intermediate alloy with the Ni content of 9.176% was prepared. It included the following steps.

S1. Blank preparation. One Ni wire with 99% purity was cut off as the core layer (the first layer), wherein the diameter $d_{Ni}$ was 0.5 mm, and the length $L_{Ni}$ was 5m; and the Ag wire with the same diameter was taken and tightly arrayed by 1 layer in total on the periphery of the Ni wire. The amount and the length of silver wires in each layer were obtained according to the amount formula and the stranding coefficient formula of the wire material, wherein the amount in the second layer was 6, the length was 7 m, and the stranding coefficient was taken as 1.4. According to the formula of $C_{Ni}=m_{Ni}/(m_{Ni}+M_{Ag})$, the theoretical content of Ni in the blank was calculated as 9.176%.

The foregoing intermediate alloy blank was stranded, weaved and rounded by using the regular stranding method in the same direction, so that each wire material was arrayed densely, and first silver stranding wire was prepared.

S2. The first silver stranding wire was connected in the vacuum diffusion method by using diffusion welding, wherein the absolute pressure of the diffusion welding was 5×10–3 Pa, the temperature was 800° C., and the duration was 1h; and the Ag—Ni and Ag—Ag interfaces had diffusion to form the metallurgical connection, so that the second silver stranding wire was obtained.

S3. The diameter of the second silver stranding wire was gradually reduced to 1 mm by using the large drawing machine, wherein the area reduction rate was 10%-15%, and the rate of drawing was 10 m/min-50 m/min; and then the silver stranding wire was continuously drawn by multiple passes by using the tower-wheeled medium-drawing machine, wherein the diameter of the silver stranding wire was uniformly reduced to 0.5 mm; the single-pass area reduction rate was 7%-10%; and the drawing rate was 150 m/min~300 m/min, so that the silver stranding wire (the silver-based intermediate alloy wire) after drawing was obtained.

S4. The middle annealing was performed on the silver stranding wire after drawing by using the on-line annealing machine at the temperature of 580° C. for 8 min, and it was protected by using the inert gas during the annealing process, wherein the flow rate was 3 L/min. A plurality of annealed silver stranding wires were prepared according to the above steps. It was taken 7 annealed silver stranding wires as the new core material and peripheral stranding wires, which were re-woven and stranded into a two-layer silver stranding wire according to the method in step S1, and the diffusion connection-drawing was performed again according to the methods in steps S2-S3. It was iterated 1 time according to the above steps, and no further annealing was carried out after the last iteration, so as to obtain the final silver-based intermediate alloy wire.

The final obtained silver-based intermediate alloy wire was cut into 3-10 mm segments for use as an intermediate alloy.

Example 3

As an example, a silver-based intermediate alloy with the Co content of 4.296% was prepared. It included the following steps.

S1. Blank preparation. One Co wire with 99% purity was cut off as the core layer (the first layer), wherein the diameter $d_{Co}$ was 1 mm, and the length $L_{Co}$ was 2m; and the Ag wire with the same diameter was taken and tightly arrayed by three layers in total on the periphery of the Co wire. The amount and the length of silver wires in each layer were obtained according to the amount formula and the stranding coefficient formula of the wire material, wherein the amount in the second layer was 6, the length was 2.1 m, and the stranding coefficient was taken as 1.05; and the amount in the third layer was 12, the length was 2.1 m, and the stranding coefficient was taken as 1.05. According to the formula of $C_{Co}=m_{Co}/(m_{Co}+M_{Ag})$, the theoretical content of Co in the blank was calculated as 4.296%.

The foregoing intermediate alloy blank was stranded, weaved and rounded by using the regular stranding method in the same direction, so that each wire material was arrayed densely, and first silver stranding wire was prepared.

S2. The first silver stranding wire was connected in the vacuum diffusion method by using diffusion welding, wherein the absolute pressure of the diffusion welding was 5×10–3 Pa, the temperature was 850° C., and the duration was 2h; and the Ag—Co and Ag—Ag interfaces has diffusion to form the metallurgical connection, so that the second silver stranding wire was obtained.

S3. The diameter of the second silver stranding wire was gradually reduced to 1 mm by using the large drawing machine, wherein the area reduction rate was 10%-15%, and the rate of drawing was 10 m/min-50 m/min; and then the silver stranding wire was continuously drawn by multiple passes by using the tower-wheeled medium-drawing machine, wherein the diameter of the silver stranding wire was uniformly reduced to 0.5 mm; the single-pass area reduction rate was 7%-10%; and the drawing rate was 150 m/min~300 m/min, so that the silver stranding wire (the silver-based intermediate alloy wire) after drawing was obtained.

S4. The middle annealing was performed on the silver stranding wire after drawing by using the on-line annealing machine at the temperature of 560° C. for 6 min, and it was protected by using the inert gas during the annealing process, wherein the flow rate was 3 L/min. A plurality of annealed silver stranding wires were prepared according to the above steps. It was taken 7 annealed silver stranding wires as the new core material and peripheral stranding wires, which were re-woven and stranded into a two-layer silver stranding wire according to the method in step S1, and the diffusion connection-drawing was performed again according to the methods in steps S2-S3. It was iterated 2 times according to the above steps, and no further annealing was carried out after the last iteration, so as to obtain the final silver-based intermediate alloy wire.

The final obtained silver-based intermediate alloy wire was cut into 3-10 mm segments for use as an intermediate alloy.

Example 4

As an example, a silver-based intermediate alloy with the Cr content of 1.481% was prepared. It included the following steps.

S1. Blank preparation. One Cr wire with 99% purity was cut off as the core layer (the first layer), wherein the diameter der was 1 mm, and the length $L_{Cr}$ was 2m; and the Ag wire with the same diameter was taken and tightly arrayed by four layers in total on the periphery of the Cr wire. The amount and the length of silver wires in each layer were obtained according to the amount formula and the stranding coefficient formula of the wire material, wherein the amount in the second layer was 6, the length was 2.8 m, and the stranding coefficient was taken as 1.4; the amount in the third layer was 12, the length was 2.6 m, and the stranding coefficient was taken as 1.3; and the amount in the fourth layer was 18, the length was 2.4 m, and the stranding coefficient was taken as 1.2. According to the formula of $C_{Cr}=m_{Cr}/(m_{Cr}+m_{Ag})$, the theoretical content of Cr in the blank was calculated as 1.481%.

The foregoing intermediate alloy blank was stranded, weaved and rounded by using the regular stranding method in the same direction, so that each wire material was arrayed densely, and first silver stranding wire was prepared.

S2. The first silver stranding wire was connected in the vacuum diffusion method by using diffusion welding, wherein the absolute pressure of the diffusion welding was $5\times10^{-3}$ Pa, the temperature was 820° C., and the duration was 2h; and the Ag—Cr and Ag—Ag interfaces had diffusion to form the metallurgical connection, so that the second silver stranding wire was obtained.

S3. The diameter of the second silver stranding wire was gradually reduced to 1 mm by using the large drawing machine, wherein the area reduction rate was 10%-15%, and the rate of drawing was 10 m/min-50 m/min; and then the silver stranding wire was continuously drawn by multiple passes by using the tower-wheeled medium-drawing machine, wherein the diameter of the silver stranding wire was uniformly reduced to 0.5 mm; the single-pass area reduction rate was 7%-10%; and the drawing rate was 150 m/min~300 m/min, so that the silver stranding wire (the silver-based intermediate alloy wire) after drawing was obtained.

S4. The middle annealing was performed on the silver stranding wire after drawing by using the on-line annealing machine at the temperature of 540° C. for 5 min, and it was protected by using the inert gas during the annealing process, wherein the flow rate was 3 L/min. A plurality of annealed silver stranding wires were prepared according to the above steps. It was taken 7 annealed silver stranding wires as the new core material and peripheral stranding wires, which were re-woven and stranded into a two-layer silver stranding wire according to the method in step S1, and the diffusion connection-drawing was performed again according to the methods in steps S2-S3. It was iterated 2 times according to the above steps, and no further annealing was carried out after the last iteration, so as to obtain the final silver-based intermediate alloy wire.

The final obtained silver-based intermediate alloy wire was cut into 3-10 mm segments for use as an intermediate alloy.

Comparative Example 1

A silver-nickel intermediate alloy wire with Ni content of 1.184% was prepared by a traditional smelting-rolling method. The preparation method was as follows.

S1: 11.84 g pure Ni particles with a purity of 99% were weighed by an electronic balance; 988.16 g pure silver particles with a purity of 99% were weighed; and they were mechanically stirred for 5 min to be mixed uniformly.

S2: The mixed power was smelted in a vacuum continuous casting furnace, wherein the absolute pressure was $5\times10^{-3}$ Pa, the smelting temperature was 1250° C., and it was electromagnetically stirred for 30 min during the smelting process. After cooling to room temperature in the furnace, a φ8 mm blank rod was cast under the protection of argon, wherein a casting speed was 30 mm/min.

S3: The diameter of the continuous casting blank rod was reduced to 0.5 mm by using the method of multiple-pass continuous drawing, wherein the single-pass area reduction rate was 7%-15%, and the drawing rate was 10-300 m/min.

S4: The final obtained silver-based thin alloy wire was cut into 3-10 mm segments for use as an intermediate alloy.

Experimental Example (1) By using the Inductively coupled plasma spectrometer, the Ni element content detection was performed on the silver-based intermediate alloy wire obtained in step S3 of Example 1, the final silver-based intermediate alloy wire obtained in step S4 of Example 1, and the silver-based intermediate alloy wire obtained in Comparative Example 1 by the smelting method. The sampling method was that 0.1 g of silver-based intermediate alloy wire was taken every 10 meters as a sample for composition test, and 10 samples were taken for test. The test result is shown in Table 1.

TABLE 1

| | Nickel content (%) | | |
| | Example 1 | | |
| Sample | S3 intermediate alloy wire | S4 intermediate alloy wire | Comparative Example 1 |
|---|---|---|---|
| 1 | 1.1845 | 1.1843 | 2.1908 |
| 2 | 1.1848 | 1.1843 | 1.2339 |
| 3 | 1.1828 | 1.1840 | 3.8814 |
| 4 | 1.1841 | 1.1837 | 0.3179 |
| 5 | 1.1835 | 1.1841 | 1.0230 |
| 6 | 1.1832 | 1.1842 | 2.6955 |
| 7 | 1.1825 | 1.1839 | 3.1062 |
| 8 | 1.1836 | 1.1845 | 2.6806 |
| 9 | 1.1826 | 1.1838 | 0.3445 |
| 10 | 1.1834 | 1.1839 | 0.2513 |
| Average value | 1.1835 | 1.18407 | 1.77251 |
| Mean value error | 0.00050 | 0.00007 | 0.58851 |
| Standard deviation | 0.000779 | 0.000254 | 1.308039 |

As can be seen from the data in Table 1 that the target content of the Ni element is 1.184%; the average value of the 10 samples of the silver-based intermediate alloy prepared by the stranding method of the present disclosure is 1.18407%; the error is only 0.00007%; and the standard deviation is only 0.000254%, which indicates that the fluctuation in composition is very small. The composition of insoluble intermediate alloy prepared by this stranding method is accurate and precise. The average value of the sample obtained by the stranding method without multiple iterations was 1.1835%, and the error was 0.00050%, which has a slightly larger error than that of the method with multiple iterations; and the standard deviation was 0.000779%, which indicates that the composition fluctuation was slightly larger than that the method with multiple iterations, but it was significantly better than that of the traditional smelting method. The average value of the 10 samples of the silver-based intermediate alloy prepared by the traditional smelting-rolling method was 1.77251%, which significantly deviated from the target composition; the error reaches 0.58851%, and the standard deviation reaches 1.308039%, which reflects the fluctuation of data is quite large, and the accuracy of the traditional smelting preparation method is poor.

It can be seen from the above analysis that compared with the traditional smelting method, the uniformity of element distribution in the intermediate alloy prepared by the method of the present disclosure is better, and the element content is more accurate.

(2) By using the inductively coupled plasma spectrometer, the content of the insoluble element in the final silver-based intermediate alloy wires obtained by step S4 in Examples 2-4 was detected. The sampling method was that 0.1 g of silver-based intermediate alloy wire was taken every 10 meters as the sample for composition test, and 10 samples were taken for test. The test result is shown in Table 2.

TABLE 2

| Sample | Example 2 Ni content (%) | Example 3 Co content (%) | Example 4 Cr content (%) |
|---|---|---|---|
| 1 | 9.1764 | 4.2956 | 1.4801 |
| 2 | 9.1755 | 4.2963 | 1.4802 |
| 3 | 9.1758 | 4.2951 | 1.4812 |
| 4 | 9.1759 | 4.2957 | 1.4803 |
| 5 | 9.1757 | 4.2959 | 1.4809 |
| 6 | 9.1762 | 4.2959 | 1.4809 |
| 7 | 9.1762 | 4.2953 | 1.4803 |
| 8 | 9.1758 | 4.2954 | 1.4808 |
| 9 | 9.1755 | 4.2956 | 1.4807 |
| 10 | 9.1760 | 4.2957 | 1.4801 |
| Average value | 9.17590 | 4.29565 | 1.48055 |
| Mean value error | 0.00010 | 0.00035 | 0.00045 |
| Standard deviation | 0.000302 | 0.000341 | 0.000395 |

As can be seen from the data in Table 2, Examples 2, 3, and 4 respectively adopt Ag—Ni, Ag—Co, and Ag—Cr intermediate alloys prepared by the stranding method respectively. The average values of their sample data are 9.17590%, 4.29565%, and 1.48055%, respectively, and the errors relative to theoretical concentrations of three samples are 0.00010%, 0.00035%, and 0.00045% respectively. The overall error level is in the same order of magnitude as that in Example 1, and it shows a rule that the higher the theoretical solubility is, the smaller the error is. The standard deviations of three samples were 0.000302%, 0.000341%, and 0.000395% respectively, which are equivalent to the level of Example 1, which indicates that the composition is uniform.

(3) The final silver-based intermediate alloy obtained in step S4 of Example 1 and the silver-based intermediate alloy obtained in Comparative Example 1 were used to prepare Φ18 μm SHP silver-based bonding wires respectively, and the pulling strength and elongation rate of the obtained silver-based bonding wires were tested.

Preparation of the silver-based bonding wire: 1. Material preparation: 1 g of intermediate alloy and 999 g of pure silver particles were weighted; the mechanical stirring was performed, and the mixture was mixed uniformly and loaded into the crucible. 2. Continuous casting: the silver-based alloy was smelted in the vacuum by using the vacuum continuous casting furnace, wherein the absolute pressure was $5\times10^{-3}$ Pa; the smelting temperature was 1150° C.; and the electromagnetic stirring was performed for 30 min; the high-purity argon was introduced, and it was cast into a blank rod with a diameter of 8 mm. 3. Rough drawing: the diameter of the silver-based intermediate alloy blank rod was reduced to 0.1 μm in multiple passes by using the large drawing machine and the middle drawing machine, wherein the area reduction rate was 10%-15%, and the drawing speed was 8 m/min-250 m/min. 4. Middle annealing: the nitrogen-protection annealing was performed by using the on-line annealing furnace at 450° C. for 1 min. 5. Precision drawing: the diameter was reduced to 18 μm in multiple-pass drawing by using the fine drawing machine and the micro-wire drawing machine, wherein the area reduction rate was 7%-10%, and the drawing speed was 300 m/min-400 m/min. 6. Final annealing: the nitrogen protection annealing was performed by using the on-line annealing furnace at 300° C. for 0.5s.

The pulling strength and elongation rate of the finished wire were performed according to the standard GB/T10573-2020. The test result is shown in Table 3.

TABLE 3

| Sample | Example 1 Pulling strength (gf) | Example 1 Elongation rate (%) | Comparative Example 1 Pulling strength (gf) | Comparative Example 1 Elongation rate (%) |
|---|---|---|---|---|
| 1 | 4.553 | 13.15 | 4.425 | 14.43 |
| 2 | 4.530 | 12.59 | 4.540 | 13.39 |
| 3 | 4.546 | 12.49 | 4.427 | 12.58 |
| 4 | 4.523 | 13.02 | 4.413 | 12.95 |
| 5 | 4.551 | 13.23 | 4.337 | 11.98 |
| 6 | 4.566 | 12.46 | 4.319 | 12.09 |
| 7 | 4.549 | 12.49 | 4.421 | 14.02 |
| 8 | 4.554 | 12.71 | 4.284 | 12.46 |
| 9 | 4.537 | 13.01 | 4.295 | 11.42 |
| 10 | 4.537 | 12.78 | 4.377 | 11.36 |
| Average value | 4.5446 | 12.793 | 4.3838 | 12.668 |
| Absolute fluctuation range of elongation rate | — | 0.77 | — | 3.07 |

As can be seen from the data in Table 3 that the average pulling strength of the SHP bonding wire prepared by using the silver-based intermediate alloy in Example 1 of the present disclosure reaches 4.5446 gf, and the elongation rate is 12.793%. The average pulling strength of the SHP bonding wire prepared by using the silver-based intermediate alloy obtained by using the smelting method in Comparative Example 1 is only 4.3838 gf, which is lower than that of the stranding method; and the elongation rate is 12.668%, which is lower than that of the stranding method. It indicates that silver-based intermediate alloy prepared by the stranding method has a better reinforcement effect on the bonding wire. The absolute fluctuation range of elongation rate of the bonding wire prepared by the silver-based intermediate alloy in the Example of the present disclosure is only 0.77%, but the absolute fluctuation range of elongation of the bonding wire prepared by the silver-based intermediate alloy in the Comparative Example 1 reaches 3.07%, which reflects that the component of the bonding wire prepared by the silver-based intermediate alloy provided by the present disclosure is more uniform.

Although the present disclosure has been illustrated and described with the specific embodiments, but it should be realized that each embodiment above is used only to illustrate the technical solutions of the present disclosure and is not a limitation thereof. It should be understood by those of ordinary skill in the art that the technical solutions recorded in the foregoing embodiments may be modified, or partial or all of the technical features therein may be equivalently replaced without departing from the spirit and scope of the present disclosure; and these modifications or replacements do not take the essence of the corresponding technical solutions out of the scope of the technical solutions of the embodiments of the present disclosure. Therefore, it means that all of these replacements and modifications falling within the scope of the present disclosure are included in the appended claims.

What is claimed is:

1. A preparation method of an intermediate alloy, comprising following steps:

S1, performing stranding by taking a wire material of a doping element as a core material and taking a base material wire as a peripheral stranding wire to obtain a first stranding wire;

S2, performing diffusion welding on the first stranding wire in a vacuum environment or under a protection of an inert atmosphere, so that a metallurgical bonding is formed between the wire material of the doping element and the base material wire, so as to obtain a second stranding wire; and S3, drawing the second stranding wire to break through a solubility limitation of an insoluble element in the base material to obtain an intermediate alloy wire having improved uniformity of the insoluble element in the intermediate alloy.

2. The preparation method of the intermediate alloy according to claim 1, wherein a following step is further comprised after step S3:

S4, performing at least one iterative operation according to steps S1, S2, and S3 by taking the intermediate alloy wire as a new core material and a peripheral stranding wire, wherein an intermediate alloy wire obtained in a previous step needs to be annealed before each iterative operation.

3. The preparation method of the intermediate alloy according to claim 1, wherein the wire material of the doping element comprises any one of a Ni wire, a Co wire, or a Cr wire; and the base material wire is a silver wire.

4. The preparation method of the intermediate alloy according to claim 1, wherein at least one of following features is comprised in step S1:

(1) a wire material purity of the doping element is ≥99%;

(2) a purity of the base material wire is ≥99.9%;

(3) a method of the stranding is regular stranding in a same direction;

(4) the core material and the peripheral stranding wire have the same wire diameter; and in the first stranding wire, one core material is provided, and a total amount of wire materials of the core material and the peripheral stranding wire is N=1+3k(k−1), where k is an amount of layers of stranding wires;

(5) in the first stranding wire, the amount k of layers of the stranding wires satisfies: 2≤k≤6;

(6) a stranding coefficient θ of any layer during the stranding is between 1 and 1.447;

(7) a mass percentage of the doping element in the intermediate alloy is calculated according to a following formula: $C_x=m_x/(m_x+m_a)-A_xL_x\rho_x/[A_xL_x\rho_x+\Sigma(n_{ia}A_a\rho_aL_x\theta_i)]$, where a summation operation in the formula is to add from i=2 to k, where $m_x$ is a mass of the wire material of the doping element; $m_a$ is a mass of the base material wire; $A_x$ is a sectional area of the wire material of the doping element; $L_x$ is a length of the wire material of the doping element; $\rho_x$ is a density of the wire material of the doping element; $n_i$ is an amount of base material wires of layer i; $A_a$ is a sectional area of the base material wire; $\rho_a$ is a density of the base material wire; $\theta_i$ is a stranding coefficient of the layer i; and $L_x\theta_i$ is a length of a single base material wire of the layer i; or (8) a mass percentage of the doping element in the intermediate alloy is 0.5%-10%.

5. The preparation method of the intermediate alloy according to claim 1, wherein in step S2, the vacuum environment has an absolute pressure of ≤5×10⁻³ Pa; and/or the diffusion welding is performed at a temperature of 800-900° C. for 1-2h.

6. The preparation method of the intermediate alloy according to claim 1, wherein in step S3, a single-pass area reduction rate of the drawing is 7%-15%, and a rate of the drawing is 10-300 m/min; and/or a wire diameter of the intermediate alloy wire obtained after the drawing is 0.5-1 mm.

7. The preparation method of the intermediate alloy according to claim 2, wherein at least one of following features is comprised in step S4:

(1) the iterative operations are performed 2-4 times;

(2) an amount of layers of stranding of the intermediate alloy wire during the iterative operation is 2-6 layers; or (3) a wire diameter of a final intermediate alloy wire obtained after the iterative operation is 0.5-1 mm.

8. The preparation method of the intermediate alloy according to claim 2, wherein in step S4, an annealing temperature is 300-750° C., and an annealing duration is 1-10 min.

* * * * *